United States Patent
Long et al.

(10) Patent No.: US 7,780,090 B2
(45) Date of Patent: Aug. 24, 2010

(54) CHIP CARD HOLDER

(75) Inventors: Shi-Jin Long, Shenzhen (CN); Li Cheng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/510,792

(22) Filed: Jul. 28, 2009

(65) Prior Publication Data

US 2010/0051697 A1 Mar. 4, 2010

(30) Foreign Application Priority Data

Aug. 29, 2008 (CN) .......................... 2008 1 0304314

(51) Int. Cl.
*G06K 7/00* (2006.01)

(52) U.S. Cl. .......................... 235/486; 439/59; 439/153; 439/159; 439/328

(58) Field of Classification Search ................. 235/486; 439/59, 153, 159, 328

See application file for complete search history.

(56) References Cited

U.S. PATENT DOCUMENTS

| | | | | |
|---|---|---|---|---|
| 7,094,082 | B2 * | 8/2006 | Ooya et al. | 439/159 |
| 7,374,440 | B2 * | 5/2008 | Chen et al. | 439/159 |
| 7,520,766 | B2 * | 4/2009 | Tsai | 439/159 |
| 2006/0134954 | A1 * | 6/2006 | Xu et al. | 439/159 |
| 2006/0270260 | A1 * | 11/2006 | Chen et al. | 439/159 |
| 2007/0010114 | A1 * | 1/2007 | Zhao | 439/159 |
| 2007/0141878 | A1 * | 6/2007 | Van der Steen et al. | 439/159 |
| 2009/0269944 | A1 * | 10/2009 | Gao et al. | 439/59 |

* cited by examiner

*Primary Examiner*—Allyson N Trail
(74) *Attorney, Agent, or Firm*—Steven M. Reiss

(57) ABSTRACT

A chip card holder includes a body member, a card receiving space formed on the body member and a releasing piece. The releasing piece is slidablely mounted on the body member along a direction perpendicular to the longitudinal direction of the card receiving space and is slid to be in front of the opening of the card receiving space to lock the chip card in the card receiving space or to expose the opening of the card receiving space to unlock the chip card.

7 Claims, 4 Drawing Sheets

CHIP CARD HOLDER

CROSS-REFERENCE TO RELATED APPLICATIONS

This application is related to co-pending U.S. patent application Ser. No. 12/510,777, both entitled "CHIP CARD HOLDER". Such application has the same assignee as the present application. The above-identified application is incorporated herein by reference.

BACKGROUND

1. Technical Field

The exemplary disclosure generally relates to a chip card holder for a portable electronic device.

2. Description of Related Art

With the development of wireless technology, portable electronic devices are becoming widely used and multifunctional. Portable electronic devices such as mobile phones typically have chip cards (e.g., SIM card) for storing usable information. It is necessary to provide chip card holders for holding/securing the chip card within the portable electronic device.

The chip card holder usually defines a receiving space and a holding member. The chip card can be partially received and held in the receiving space by the holding member. Accordingly, the chip card has an exposed portion which is not received in the receiving space. The exposed portion is used for the removal (e.g., to be pulled by users) of the chip card out of the receiving space. However, the exposed portion is usually too small and therefore difficult for a user to grasp in removing the chip card from the holder.

Therefore, there is room for improvement within the art.

BRIEF DESCRIPTION OF THE DRAWINGS

Many aspects of the exemplary chip card holder can be better understood with reference to the following drawings. These drawings are not necessarily drawn to scale, the emphasis instead being placed upon clearly illustrating the principles of the present methods. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
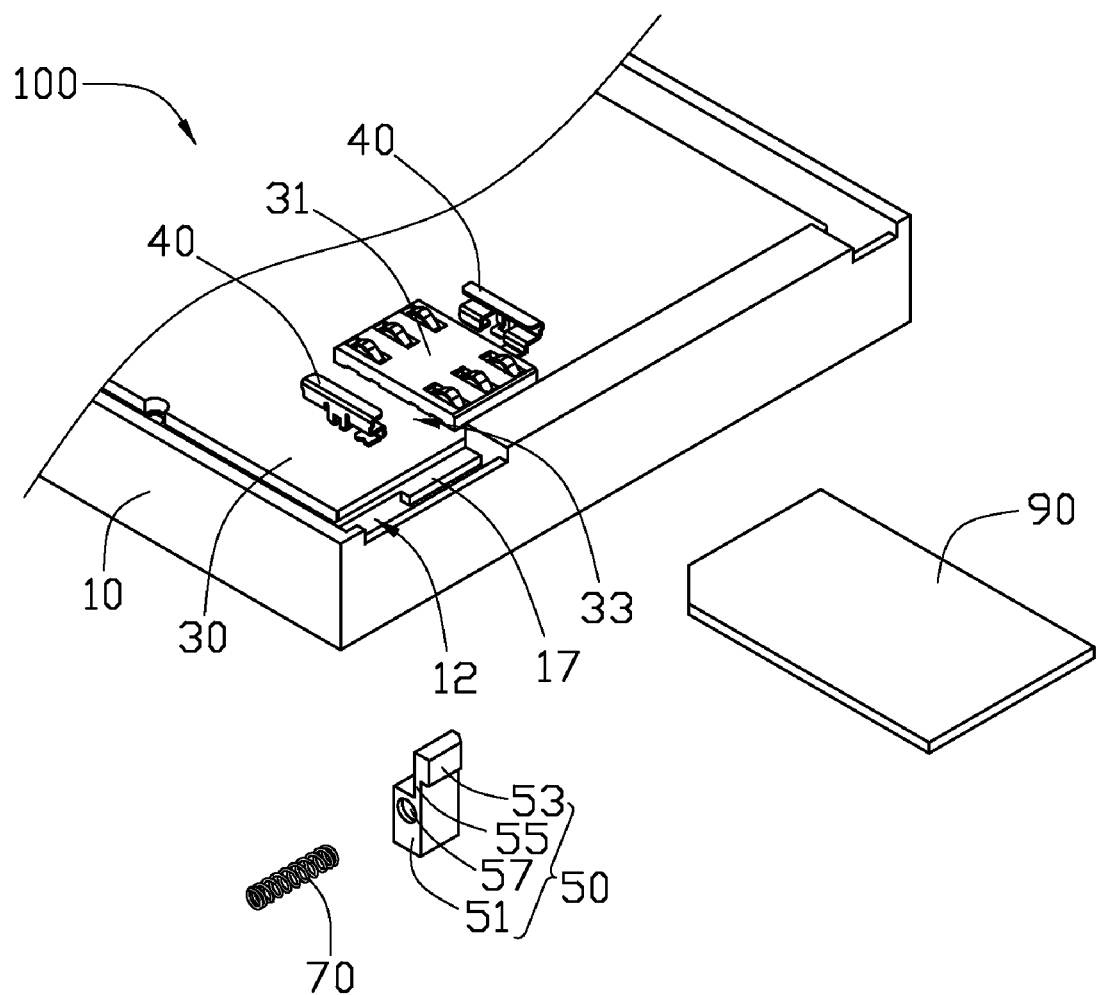
FIG. 1 shows a disassembled perspective view of a chip card holder according to an exemplary embodiment.

FIG. 1 shows an exemplary chip card holder 100 used in a portable electronic device (e.g., a mobile phone). The chip card holder 100 is used to hold a chip card 90 therein and includes a body member 10, a circuit board 30, two clamping pieces 40, a releasing piece 50 and an elastic piece 70.

The body member 10 may be part of a housing (e.g., a bottom wall thereof) of the portable electronic device. The body member 10 defines a groove 12 recessed therein adjacent to one side edge thereof so as to assemble the releasing piece 50. One end of the groove 12 defines a cylindrical post 15 (shown in FIG. 4) protruding outwardly from the end wall (not labeled) thereof toward the opposite end of the groove 12 and accommodated within the groove 12. One side wall of the groove 12 defines a guiding block 17 protruding outwardly toward and spaced to the side edge of the body member 10.

The circuit board 30 is mounted on the body member 10 adjacent to the groove 12. The circuit board 30 includes a card connector 31 disposed thereon adjacent to the opposite end of the groove 12 of the body member 10.

The two clamping pieces 40 are disposed on the circuit board 30 and located at the two opposite sides of the card connector 31 respectively. The two clamping piece 40, the circuit board 30, and the card connector 31 together form a card receiving space 33. The card receiving space 33 has an opening (not labeled) toward the opposite end of the groove 12 so as to receive the chip card 90 therein. The opening is used to insert the chip card in the longitudinal direction of the card receiving space 33. Thus, the groove 12 is disposed in the longitudinal direction of the card receiving space 33 and adjacent to the opening of the card receiving space 33.

The releasing piece 50 is a substantially Z-shaped cross sectional body and is slidably assembled to the groove 12 along a direction perpendicular to the longitudinal direction of the card receiving space 33 and partially accommodated within the groove 12 of the body member 10 so as to lock and release the chip card 90. The releasing piece 50 includes a connecting board 55, an assembling end 51 and an opposite controlling end 53. The connecting portion 55 is configured for being slidably assembled with the groove 12 along the guiding block 17. The assembling end 51 defines an assembling blind hole 57 in the side wall thereof corresponding to the cylindrical post 15 within the groove 12 of the body member 10. The controlling end 53 is configured for being slidably assembled with the body member 10 and located in front of the opening of the card receiving space 33.

The elastic piece 70 may be a coil spring and is elastically assembled within the groove 12 of the body member 10. It is to be understood that the elastic piece 70 also could be a sponge, a plate spring, a compressing spring and so on.

Figure 4:
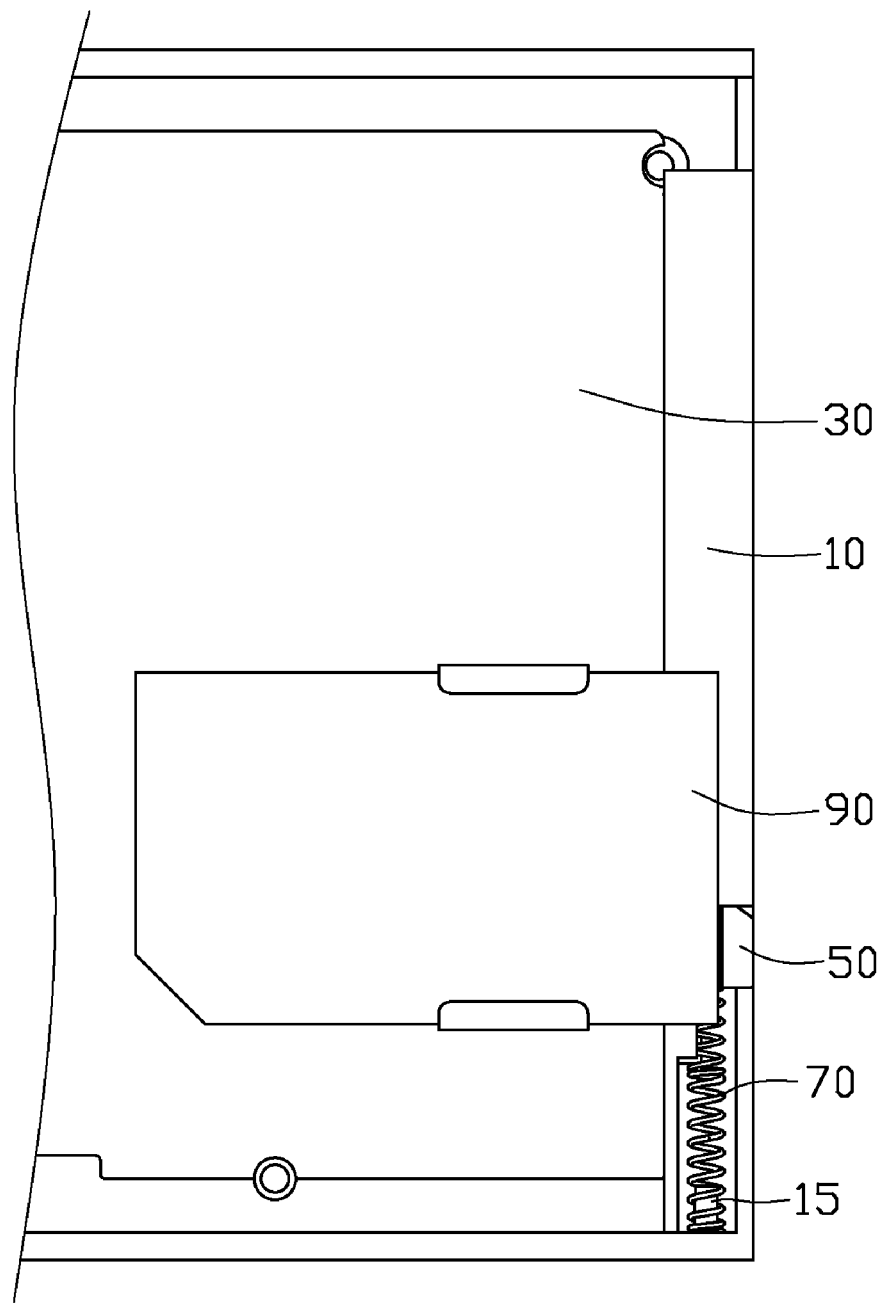
FIG. 4 shows a top plan view of the chip card holder shown in FIG. 3.

Also referring to FIG. 4, in assembly, the elastic piece 70 is assembled within the groove 12 of the body member 10, one end of the elastic piece 70 wraps around the post 15 and resists on the end wall of the groove 12. The releasing piece 50 is assembled to the groove 12 of the body member 10. The assembling end 51 is inserted into the groove 12 with the blind hole 57 aligned with the post 15. The opposite end of the elastic piece 70 is compressed to align with and be inserted into the blind hole 57 of the assembling end 51. The assembling end 51 of the releasing piece 50 is pushed by the opposite end of the elastic piece 70 and resist on the opposite end wall of the groove 12 adjacent to the card receiving space 33 side. The connecting portion 55 is slidably clamped between the guiding block 17 and the opposite side wall of the groove 12. The controlling end 53 is exposed out of the groove 12 and resist on the side wall of the groove 12. The controlling end 53 pushed by the elastic piece 70 and is located in front of the opening of the card receiving space 33 so as to lock the chip card 90 within the card receiving space 33.

Figure 2:
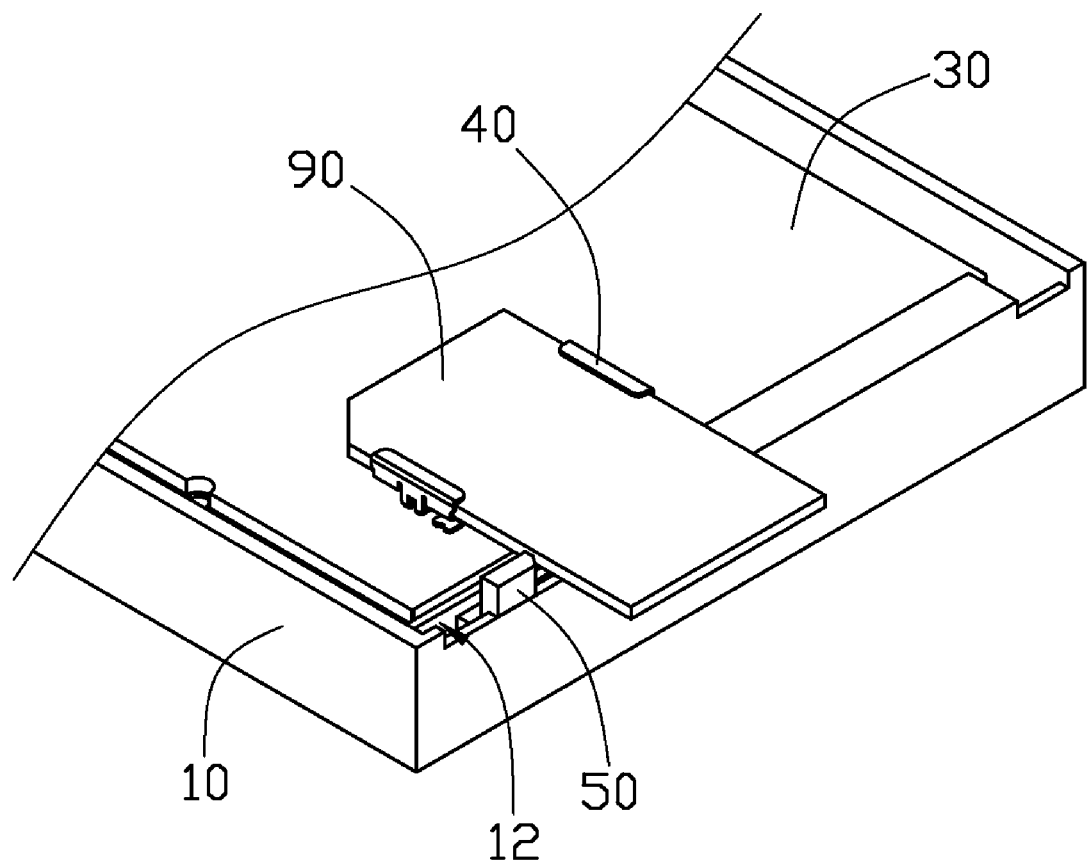
FIG. 2 shows a perspective view of the chip card holder, wherein, a chip card is partially assembled and accommodated within the card receiving space of the chip card holder.
Figure 3:
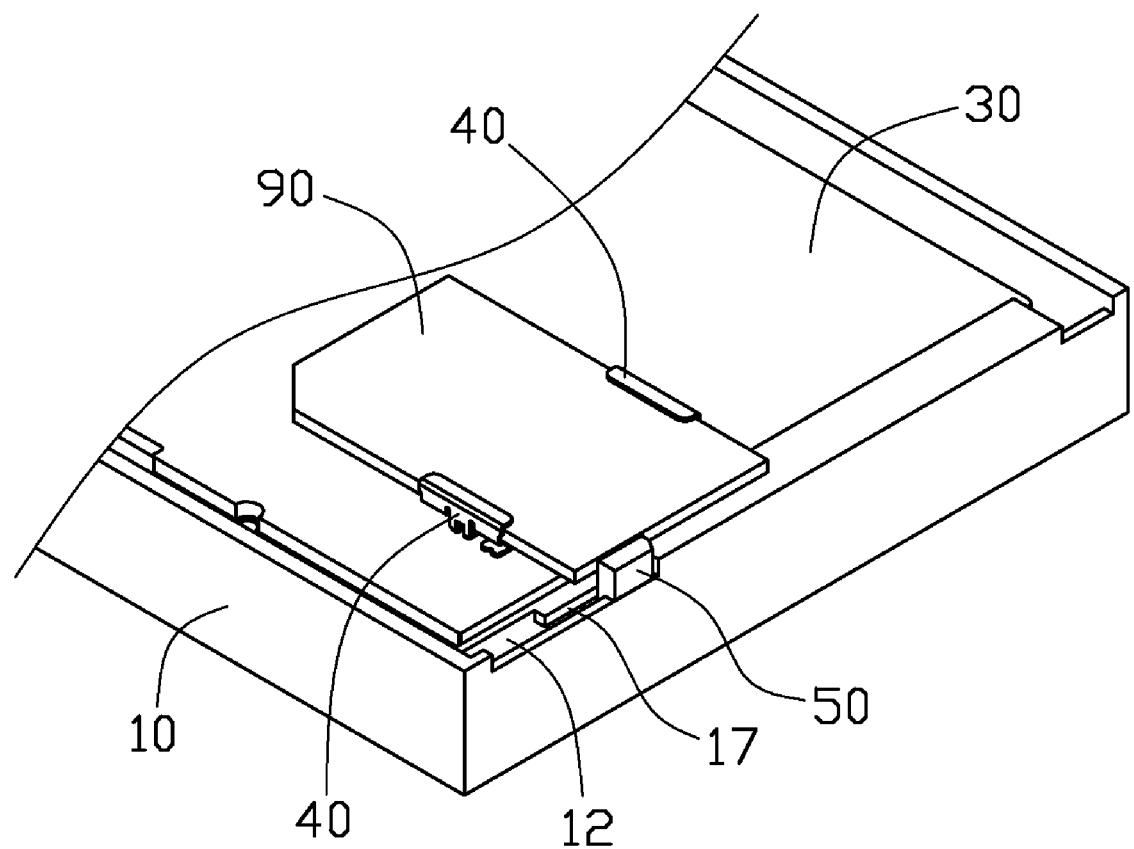
FIG. 3 shows a perspective view of the chip card holder, wherein, a chip card is assembled and accommodated within the card receiving space of the chip card holder.

Also referring to FIG. 2 and FIG. 3, when assembling the chip card 90 into the card receiving space 33 of the chip card holder 100, the releasing piece 50 is pushed toward the post 15 end till the releasing piece 50 slides aside to not obstruct the opening of the card receiving space 33. The releasing piece 50 compresses the elastic piece 70 simultaneously. One end of the chip card 90 slides along the two clamping pieces 40 into the card receiving space 33 of the chip card holder 100. The sliding direction of the releasing piece 50 is perpendicular to the inserting direction of the chip card 90. The releasing piece 50 is released and pushed by the elastic piece 70 to slide toward the opening of the card receiving space 33 and return back to the front of the opening of the card receiving space 33. The releasing piece 50 resists on the opposite end of the chip card 90 to hold and prevent the chip card 90 departing from the card receiving space 33, thus, the chip card 90 is tightly locked and accommodated within the card receiving space 33.

To release the chip card 90 from the card receiving space 33 of the chip card holder 100, the releasing piece 50 is pushed toward the post 15 end to compress the elastic piece 70 till the releasing piece 50 slides aside to not obstruct the opening of the card receiving space 33. Thus, the chip card 90 can be taken out easily by sliding out along the two clamping pieces 40 and the releasing piece 50 is released to return back to the original position.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A chip card holder comprising:
   a body member defining a card receiving space and configured for accommodating a chip card therein, the card receiving space having an opening to insert the chip card along a longitudinal direction thereof; and
   a releasing piece slidablely mounted on the body member along a direction perpendicular to the longitudinal direction of the card receiving space and being slidable to be in front of the opening of the card receiving space to lock the chip card in the card receiving space or to expose the opening of the card receiving space to unlock the chip card;
   wherein the body member further defines a groove therein adjacent to and in front of the opening of the card receiving space, the groove receiving a post therein, the post protruding from the end wall of the groove; the releasing piece includes an assembling end and a controlling end; the assembling end is assembled within the groove and defines an assembling blind hole in the side wall thereof corresponding to the post, and the controlling end is exposed out of the groove and is thereby configured for locking or releasing the chip card.

2. The chip card holder as claimed in claim 1, wherein the chip card holder further includes an elastic piece elastically assembled within the groove and resists on the releasing piece to provide a pushing force to the releasing piece.

3. The chip card holder as claimed in claim 2, wherein the groove defines a guiding block protruding outwardly from one side wall thereof toward and spaced to the opposite side wall thereof; the releasing piece further includes a connecting board configured for connecting the assembling end and the controlling end, the connecting board is slidably clamped between the guiding block and the opposite side wall of the groove.

4. The chip card holder as claimed in claim 3, wherein one end of the elastic piece wraps around the post and resists on the end wall of the groove, the opposite end of the elastic piece is inserted into the blind hole of the assembling end and resists on the assembling end.

5. The chip card holder as claimed in claim 4, wherein the chip card holder further includes a circuit board and two clamping pieces, the circuit board is mounted on the body member adjacent to the groove; the two clamping pieces are spaced apart and disposed on the circuit board, perpendicular to the groove; the two clamping pieces, a card connector, and the circuit board form the card receiving space.

6. The chip card holder as claimed in claim 4, wherein the card connector is disposed on the circuit board and located between the two opposite clamping pieces.

7. The chip card holder as claimed in claim 1, wherein the releasing piece is a substantially Z-shaped cross sectional body.

\* \* \* \* \*